United States Patent [19]
Pruitt

[11] Patent Number: 4,761,722
[45] Date of Patent: Aug. 2, 1988

[54] SWITCHING REGULATOR WITH RAPID TRANSIENT RESPONSE

[75] Inventor: Duard L. Pruitt, Cinnaminson, N.J.

[73] Assignee: RCA Corporation, Princeton, N.J.

[21] Appl. No.: 36,535

[22] Filed: Apr. 9, 1987

[51] Int. Cl.$^4$ ............................................. H02M 3/335
[52] U.S. Cl. ...................................... 363/17; 363/124; 323/222; 323/224; 323/266
[58] Field of Search ................... 323/222, 224, 266; 363/17, 98, 124

[56] References Cited

U.S. PATENT DOCUMENTS

| | | | |
|---|---|---|---|
| 3,523,239 | 8/1970 | Heard | 323/222 |
| 3,641,422 | 2/1972 | Farnsworth et al. | 323/224 |
| 3,737,755 | 6/1973 | Calkin et al. | 363/17 |
| 3,742,330 | 6/1973 | Hodges et al. | 323/266 |
| 4,168,477 | 9/1979 | Burchall | 323/222 |
| 4,186,330 | 1/1980 | Bohringer | 315/411 |
| 4,319,359 | 3/1982 | Wolf | 307/234 |
| 4,347,474 | 8/1982 | Brooks et al. | 323/222 |
| 4,395,675 | 7/1983 | Toumani | 323/271 |
| 4,459,537 | 7/1984 | McWhorter | 323/266 |
| 4,504,882 | 3/1985 | Breton | 323/270 |
| 4,514,679 | 4/1985 | Schierjott | 323/222 |
| 4,533,986 | 8/1985 | Jones | 323/222 |
| 4,618,812 | 10/1986 | Kawakami | 323/266 |
| 4,686,615 | 8/1987 | Ferguson | 363/17 |
| 4,713,742 | 12/1987 | Parsley | 323/272 |

OTHER PUBLICATIONS

"A New Optimum Topology Switching DC-to-DC Converter," by Slobodan Cuk et al., published at pp. 160–178 of PESC 77 Record.

Primary Examiner—Patrick R. Salce
Assistant Examiner—Jeffrey Starrett
Attorney, Agent, or Firm—Clement A. Berard, Jr.; William H. Meise

[57] ABSTRACT

A switch-mode power supply includes the series combination of an inductor and a controllable switch adapted to be coupled to a voltage source for producing a succession of increasing and decreasing ramp currents through the inductor. The average value of the ramp currents is controlled by a feedback loop. A second controllable switch arrangement is coupled for causing the current leaving the inductor to recirculate through the inductor during those intervals in which the second switch is conductive. An integrator is coupled to the inductor for integrating ramp current from the inductor during those intervals in which the second switch is nonconductive, for generating load voltage. A second feedback arrangement senses the load voltage and controls the average conduction of the second switch to control the load voltage. In one embodiment, an inverter receives ramp current from the inductor and generates alternating current, which are transformed and rectified before application to the integrator.

10 Claims, 9 Drawing Sheets

SWITCHING REGULATOR WITH RAPID TRANSIENT RESPONSE

This invention relates to switching regulators in which the maximum load current continuously flows toward the load and in which a pulse-width-modulated switch allows current to flow to the load or, alternatively, diverts the current around the load to effect voltage regulation.

BACKGROUND OF THE INVENTION

Voltage regulators of the switching type are in common use. Switching regulators are more efficient in their energy use than either linear series pass voltage regulators or linear shunt voltage regulators. The advantage of higher energy efficiency is extremely important in those applications in which large amounts of power are voltage regulated. For example, switching regulators could advantageously be used for the regulation of voltage for television transmitters, radar trarsmitters and the like.

Some types of radar transmitters produce pulses of relatively constant duration which recur at a fixed pulse recurrence rate or pulse recurrence frequency (PRF). The ratio of the radar pulse transmitting time to the inter-pulse period is termed the duty cycle. Modern high performance radar systems make use of the frequency and phase of the return or echo signal relative to the transmitted signal, and may operate in a mode in which the duty cycle may change from pulse to pulse. Thus, the load presented by the radar transmitter to its power supply in such a high performance radar system changes from moment to moment in a dynamic manner. These dynamic load changes may be of large magnitude, as for example when a radar system switches from a standby mode to a maximum duty cycle mode of operation.

The transmitters of high performance radar systems are extremely voltage sensitive, because the phase and frequency of the transmitted signal are affected by the transmitter power supply voltages. Consequently, the switching regulator must have an extremely wide dynamic range in order to maintain the regulated voltage within the required accuracy notwithstanding major variations in the duty cycle. It has been discovered that a major limitation in conventional pulse-width-modulated regulators is attributable to the length of time required to bring the current in the energy storage inductor from its idle current level (as from the standby condition) to the maximum current required for the highest duty cycles. It is desirable to improve the transient response of switching regulators.

SUMMARY OF THE INVENTION

A switching regulator includes an inductor, and a controllable first switch serially coupled with the inductor for forming a series combination of two elements. The series combination of two elements is adapted to be coupled to a source of direct voltage for causing an increasing ramp current through the inductor when the first switch is conductive and for causing the ramp current to decrease when the switch is nonconductive. A first control arrangement is coupled to the first switch and to the inductor for sensing the increasing and decreasing inductor currents and for recurrently operating the first switch into conductive and nonconductive conditions in a manner which maintains the inductor current substantially constant. An integrator is coupled for receiving at least a part of the inductor current for generating a load voltage which may be applied to a load. A controllable second switch is coupled to the inductor for selectively short circuiting the inductor by causing the inductor current to bypass the integrator and the load, and causing the inductor current instead to be recirculated through the inductor. A second control arrangement is coupled to the second switch and to the integrator for sensing the load voltage and for recurrently operating the second switch in a manner which maintains the average value of the direct load voltage substantially constant.

DETAILED DESCRIPTION OF THE INVENTION

Figure 1:
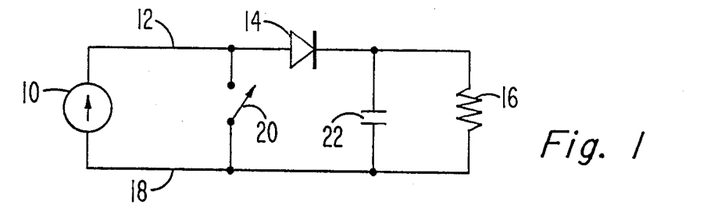
FIG. 1 is a simplified schematic diagram of a regulator according to the invention.

In FIG. 1, a current source 10 has a high output impedance (i.e., its output current is substantially unaffected by the load voltage) and produces a constant current which flows by way of conductor 12 through a rectifier diode 14 and load resistor 16, and which returns to source 10 by way of a conductor 18. Load resistor 16 represents the utilization apparatus which is to be powered. As known, a voltage is generated across load resistor 16 which is the product of the constant current from source 10 multiplied by the resistance of resistor 16.

In accordance with an aspect of the invention, a control switch represented as switch 20 is connected between conductors 12 and 18. Switch 20, and other switches related to the invention are illustrated by a symbol often used for mechanical switches, but those skilled in the art know that appropriate electronic switches are to be used. When switch 20 is open or nonconductive as illustrated in FIG. 1, it has no effect on the circuit. During those intervals in which switch 20 is closed or conductive, the constant current produced by current source 10 does not flow through load resistor 16, but instead flows by way of a path including conductor 12, switch 20 and conductor 18. The current produced by current source 10 does not increase during those intervals in which switch 20 is conductive, because of the high internal impedance of current source 10.

A capacitor 22 connected across load resistor 16 charges to a voltage equal to the voltage across resistor 16 during those intervals in which current flows through resistor 16. Diode 14 prevents discharge of capacitor 22 through switch 20 during those intervals in which switch 20 is conductive. Consequently, capacitor 22 tends to maintain the voltage across resistor 16 during those intervals in which switch 20 bypasses current away from load resistor 16. In effect, capacitor 22 is a filter which tends to average the voltage across resistor 16.

If switch 20 is rapidly opened and closed, current from current source 10 will be routed to and away from load resistor 16 and capacitor 22. The average voltage across resistor 16 and capacitor 22 will depend upon the ratio of the nonconductive periods of switch 20 to the total time during which current source 10 produces current. For example, if, during an interval in which current source 10 produces current, switch 20 is operated rapidly between conductive and nonconductive states in such a manner that it is nonconductive for 10 percent of the total time and conductive for 90 percent of the time, the average voltage across capacitor 22 will be 10 percent of the maximum possible voltage, because the average current through resistor 16 will be 10 percent of the constant current. The maximum possible voltage occurs when switch 20 is continuously nonconductive. Switch 20 may therefore be termed a "voltage regulator" switch.

Figure 2:
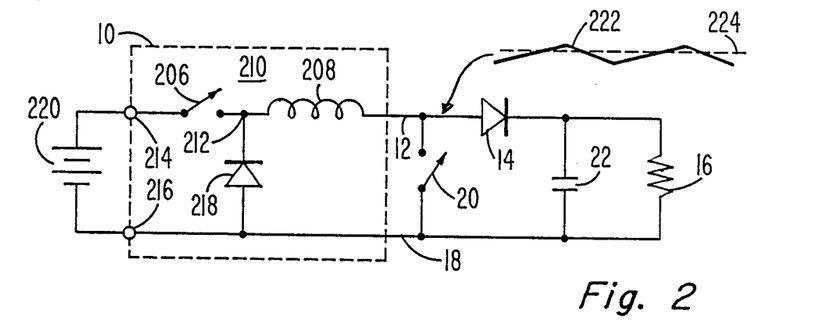
FIG. 2 is a simplified schematic diagram of the embodiment of the invention illustrated in FIG. 1, including further details relating to a current source contained therein.

FIG. 2 is a schematic diagram of a switching regulator similar to that of FIG. 1, illustrating further details of current source 10. In FIG. 2, elements corresponding to those of FIG. 1 are designated by the same reference numeral. In FIG. 2, current source 10 includes a controllable current regulator switch 206 serially connected with an inductor 208 to form a series circuit designated generally as 210. A junction point or node 212 is located at a point between switch 206 and 208. The end of switch 206 remote from junction 212 is connected to a terminal 214. A catch or free-wheeling diode 218 has its cathode connected to junction 212 and its anode connected by conductor 18 to an input terminal 216. A source of unregulated voltage (i.e., a low output impedance source) illustrated as a battery 220 is connected to terminals 214 and 216 for energizing current source 210 and the remainder of the circuit. The end of inductor 208 remote from junction 212 is connected by conductor 12 to the anode of diode 14 and to one end of voltage regulator switch 20. Current produced by current source 10 in FIG. 2 flows by way of conductor 12, through diode 14 and resistor 16, and returns by conductor 18 to terminal 216. As in FIG. 1, capacitor 22 is connected across load resistor 16. Voltage regulator switch 20 is connected between conductors 12 and 18 for periodically being rendered conductive to control the load voltage across resistor 16.

In operation, switch 206 is controlled by a control circuit described below to recurrently assume conductive and nonconductive conditions. In the conductive condition, switch 206 forms with inductor 208 a series circuit connected to voltage source 220 for generating a current in inductor 208 which progressively increases with time, thereby causing energy to be stored in the magnetic fields associated with inductor 208. During those intervals in which switch 206 is nonconductive, the energy stored in the magnetic fields associated with inductor 208 tends to maintain the current through inductor 208, causing catch diode 218 to become conductive. The increasing and decreasing ramp currents flowing in inductor 208 and on conductor 12 in response to the operation of switch 206 is represented as current waveform 222 in FIG. 2. As illustrated, the average of the increasing and decreasing ramp currents is a constant average value represented by dashed line 224.

Those skilled in the art will understand that in the arrangement of FIG. 2, a constant current can be made to flow through inductor 208, and out of current source 10 when switch 20 is closed (conductive) at all values of source voltage from battery 220. In order to maintain a constant current through inductor 208 and from current source 10 during those intervals in which switch 20 is open (nonconductive), the voltage of battery 220 must exceed the voltage across load resistor 16. As described below in conjunction with FIG. 3, an inverter may be coupled to the circuit to make the source and load voltages substantially independent of each other.

Since the rate of the ramp portions of current 222 may be affected by the operating position of switch 20, it may be desired to control the opening and closing rate of current control switch 206 to be greater than the operating rate of voltage control switch 20. According to an aspect of the invention, when the load represented by resistor 16 is a radar transmitter operated in a pulse mode, the opening of switch 20 may be synchronized with the beginning of a transmitted pulse, so as to make the full current from current source 210 available to the load, thereby preventing any momentary decrease in the load voltage.

Figure 3:
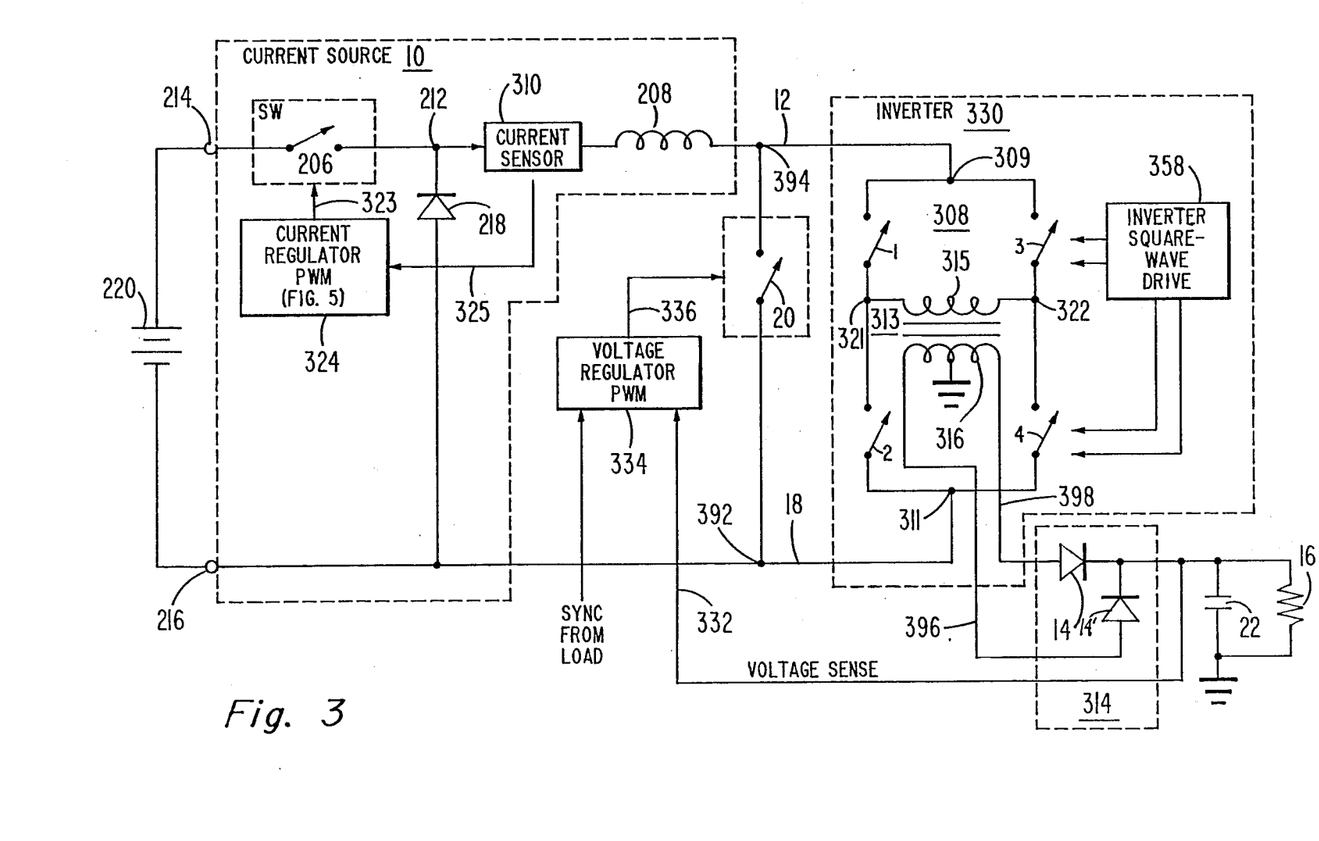
FIG. 3 is a more detailed diagram in block and schematic form of the embodiment of the invention illustrated in FIGS. 1 and 2, illustrating a current control switch arrangement and a voltage control switch arrangement.

FIG. 3 is a block and schematic diagram illustrating further details of the arrangement of FIG. 2. In FIG. 3, elements corresponding to those of FIGS. 1 and 2 are designated by the same reference numerals. In FIG. 3, a current sensor 310 is connected in series with inductor 208 for producing a current sense signal which is applied by way of a conductor 325 to current regulator circuits illustrated as a pulse-width-modulator (PWM) block 324, which produces switch control signals which are applied by way of a conductor 323 to switch 206 for feedback control of its conductive condition to maintain the current through inductor 208 substantially constant, thereby producing a high effective output impedance for current source 10. Also illustrated in FIG. 3 is a conductor 332 connected to load-representative resistor 16 for sensing the load voltage thereacross and for supplying the sensed voltage to a voltage regulator logic circuit illustrated as a PWM block 334, which processes the sensed voltage to produce on a conductor 336 logic signals which are applied to voltage regulator switch 20 for control thereof for closing a feedback loop in a manner selected to maintain the load voltage across load resistor 16 substantially constant.

As illustrated in FIG. 3, an inverter circuit designated 330 is interposed between current source 10 and rectifier 14. Inverter 330 is supplied with a constant current from current source 10 during those intervals in which switch 20 is nonconductive, and its input conductors (12,20) are short-circuited by switch 20 during those intervals when switch 20 is conductive. Thus, inverter 330 receives pulsating direct current. Inverter 330 converts the pulsating direct current which it receives into alternating current at an inverter drive frequency and applies the alternating current so produced over inverter output conductors 396 and 398 to a rectifier arrangement designated generally as 314 including rectifiers 14 and 14', which produces rectified current which is integrated by capacitor 22. Such an arrangement may be desirable when the direct voltage to be applied to load resistor 16 is substantially higher or substantially lower than the load voltage which would result from simply applying the constant current produced by current source 10 to resistor 16.

As illustrated in FIG. 3, conductor 12 is connected at a node 309 to one end of an inverter bridge circuit designated generally as 308. Node 309 is connected by way of a first path including a switch 1, an intermediate node 321 and a switch 2 to a further node 311 of inverter bridge 308. Node 311 is connected by way of conductor 18 to terminal 216 of current source 10. Node 309 is also connected by a second path including a switch 3, an intermediate node 322 and a switch 4 to node 311. The primary winding 315 of a transformer 313 is connected between intermediate nodes 321 and 322 for receiving alternating current as a result of operation of bridge circuit 308. Secondary winding 316 of transformer 313 is connected to rectifier arrangement 314, and in particular the center tap of secondary winding 316 is connected to ground, and the ends of secondary winding 316 are connected by conductors 396 and 398 to the anodes of rectifiers or diodes 14', 14, respectively, for applying transformed alternating current thereto. The cathodes of rectifiers 14, 14' are connected together for rectifying the alternating current received during operation of inverter 330. The rectified current produced by rectifier arrangement 314 is integrated by capacitor 22 to produce load voltage for the utilization means represented by resistor 16.

Inverter 330 as illustrated in FIG. 3 includes an inverter square wave drive circuit illustrated as a block 358. Block 358 controls the operating state of switches 1, 2, 3 and 4 of inverter bridge 308 in order to convert the direct current received by inverter 330 from current source 10 into alternating current. The alternating current is applied to the primary winding 315 of transformer 313.

Figure 4:
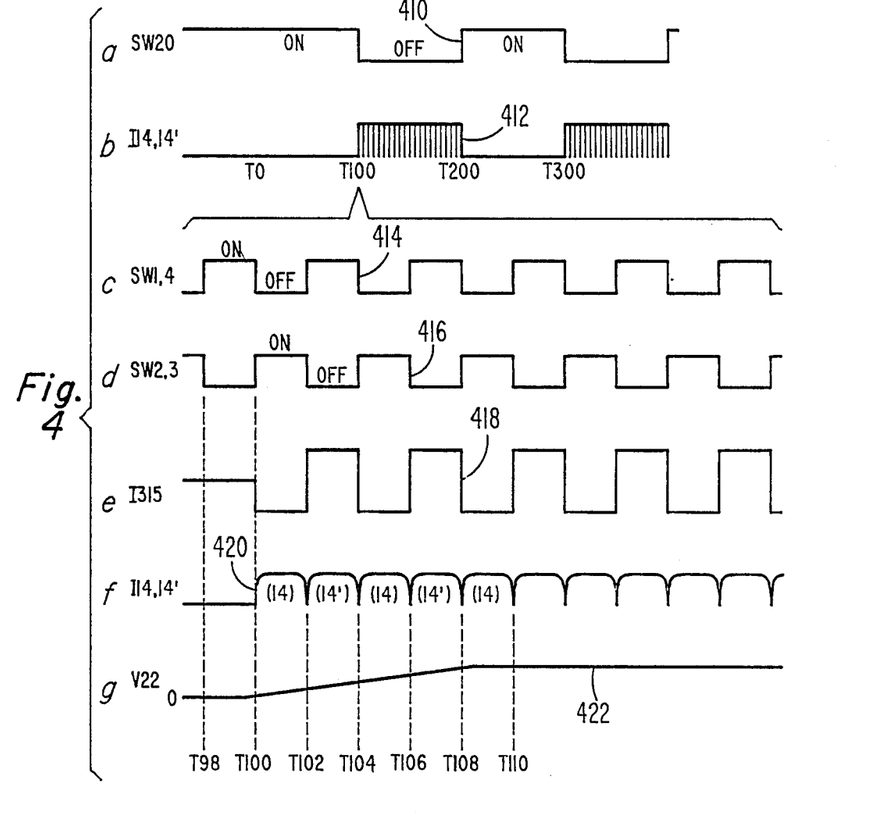
FIGS. 4a–4g, referred to jointly as FIG. 4, are a series of related timing diagrams illustrating the timing of the operation of the voltage regulation and inverter switches illustrated in FIG. 3.

Drive circuit 358 controls the operating state of switches 1, 2, 3 and 4 continuously, whether or not inverter 330 is receiving current over conductor 12. In the absence of current, as occurs during those intervals in which switch 20 is closed, bridge circuit 308 produces no alternating current through primary winding 315, even though the operating state of switches 1-4 is being switched by drive circuit 358. During those times when switch 20 is open, alternating current passes through primary winding 315 and is transformed to secondary winding 316, and rectified by rectifier arrangement 314 to generate load voltage across resistor 16. FIG. 4 illustrates details of the timing of the operation of switches 1-4 and 20.

FIG. 4a illustrates as a waveform 410 a possible operation sequence of switch 20. As illustrated in FIG. 4a, switch 20 is operated with a 50% duty cycle at times after time T100. As will be described, the duty cycle of switch 20 will vary, under the control of a feedback loop which controls the direct output voltage produced across capacitor 22 and load-representative resistance 16. A high level of waveform 410 represents a conductive or "on" state (ON) of switch 20, and a low condition of waveform 410 represents a non-conductive or "off" condition (OFF). As illustrated in FIG. 4, switch 20 turns OFF for the first time after being ON for a prolonged period, beginning at a time illustrated is T100. The OFF state continues until a time T200, and begins again at a later time T300. As mentioned, during the times when switch 20 is ON, no current is supplied to inverter 330 of FIG. 3. During those intervals such as time T100-T200 during which switch 20 is OFF, current is supplied from current source 10 of FIG. 3 to inverter 330.

FIG. 4b illustrates the current flowing through rectifiers 14 and 14' as a result of operation of inverter bridge 308. During those times such as time T0-T100 during which switch 20 is ON and no current is supplied to inverter bridge 308 of FIG. 3, no alternating current is supplied to rectifiers 14, 14', and therefore no current flows through the rectifiers. Thus, waveform 412 of FIG. 4b in the interval T0-T100 is at a zero level.

During those intervals, such as interval T100-T200, during which switch 20 of FIG. 3 is OFF, current is supplied to inverter bridge 308, and therefore inverter bridge 308 supplies alternating current to rectifiers 14, 14', which is rectified and is illustrated as having a finite level. The frequency of operation of inverter bridge 308 as controlled by drive circuit 358 of FIG. 3 is substantially higher than the switching rate of switch 20, as illustrated in FIG. 4. Consequently, the OFF period of switch 20 extending from time T100 to time T200 is long enough so that many cycles of operation of drive circuit 358 and inverter bridge 308 occur. Consequently, many pulses of rectified current flow through rectifiers 14 and 14' in the interval T100-T200, as illustrated in FIG. 4b.

FIGS. 4c-4g illustrate the operating states of switches 1-4, the alternating current flow through primary winding 315 of FIG. 3, and the pulses of current through rectifiers 14, and 14', and the voltage appearing across resistor 16 at times near time T100, respectively. In FIG. 4c, the operating state of switches 1 and 4 of FIG. 3 are illustrated as a waveform 414. As illustrated in FIG. 4c, a high level represents an ON or conductive state of switches 1 and 4, and a low condition represents an OFF or nonconductive state. As mentioned, switch drive does not depend upon the presence of current flow to inverter 330. Consequently, the conductive state or conductive ability of switches 1 and 4 is illustrated as ON or conductive in the interval T98-T100, which is before inverter 330 begins to receive current, even though no current actually flows in switches 1-4.

FIG. 4d illustrates by a waveform 416 the operating state of switches 2 and 3 of inverter bridge 308 of FIG. 3. By comparison of FIGS. 4c and 4d, it can be seen that switches 1 and 4 are OFF during those intervals in which switches 2 and 3 are ON, and correspondingly, switches 1 and 4 are ON during those intervals in which switches 2 and 3 are OFF. The simple drive waveforms required to achieve the described states of switches 1–4 are well known in the art, and there is no need to provide further details of the circuits of drive circuit 358 of FIG. 3. As a result of the operating states illustrated by waveforms 414 and 416 of FIGS. 4c and 4d respectively, alternating current is produced through primary winding 315 of FIG. 3 beginning at time T100, as illustrated by waveform 418 of FIG. 4e. As illustrated by waveform 418, the alternations of current through primary winding 315 occur at times T102, T104, T106 . . . in synchronism with the alternation of operating state of switches 1 through 4. As a result of the alternating current illustrated by waveform 418 of FIG. 4e, alternating current is produced in secondary winding 316 of FIG. 3, which is rectified and flows alternately through rectifiers 14 and 14' of FIG. 3, as illustrated by waveform 420 of FIG. 4f.

As illustrated in FIG. 4f, the pulse waveform occurring in the interval T100-T102 is designated 14 to indicate that rectifier 14 is conducting during that interval, while that pulse of waveform 420 occurring in the interval T102-T104 is marked 14', to indicate that current 420 is passing through rectifier 14'. The alternation continues in known fashion for the duration in which switch 20 of FIG. 3 is OFF or nonconductive. As a result of rectification by diodes 14 and 14' of alternating current from secondary winding 316 of FIG. 3, direct operating voltage is produced across capacitor 22 and load resistor 16 as illustrated by waveform 422 of FIG. 4g. At times preceding time T100, during which time switch 20 was conductive and therefore bridge circuit 308 was not producing alternating current, the voltage V22 across capacitor 22 was zero volts, assuming a start-up condition. If the unit has been in operation, there will be a finite, but decreasing, voltage across capacitor 22 and load resistor 16 prior to time T100.

Figure 5A:
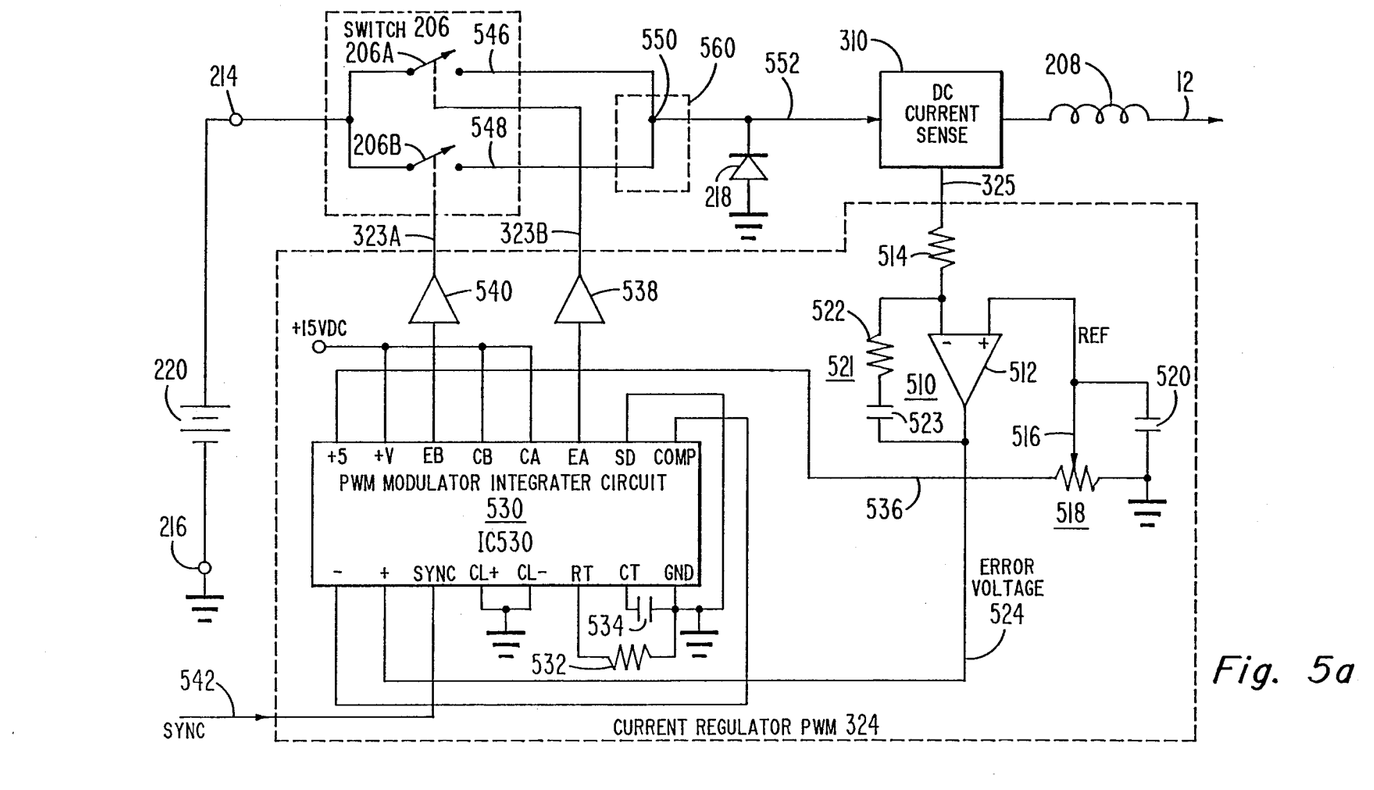
FIG. 5a illustrates details of the control circuit of the current control switch arrangement of FIG. 3, illustrating a current sensing circuit.

FIG. 5a is a diagram illustrating details of the control circuit of pulse width modulator 324 of FIG. 3. Elements of FIG. 3 corresponding to those of FIG. 5a are designated by the same reference numerals. As illustrated in FIG. 5a, switch 206 includes two paralleled switches 206A and 206B, which are independently controlled by conductors 323A and 323B. In FIG. 5a, an amplifier circuit designated generally as 510 includes an operational amplifier 512 which has its inverting (−) input terminal connected by way of a resistor 514 and a conductor 325 to current sense element 310. The noninverting (+) input terminal of amplifier 512 is connected to the wiper 516 of a potentiometer designated generally as 518 for tapping a reference voltage from the potentiometer for comparison with the sensed current. A capacitor 520 is connected between wiper 516 and ground for noise reduction.

A feedback network 521 including a feedback resistor illustrated as 522 and an associated coupling capacitor 523 may be coupled between the inverting input terminal and the output terminal of operational amplifier 512, if desired, for controlling the gain and bandwidth as required for operation of the current regulation feedback loop. Amplifier 512 produces an error voltage on a conductor 524 which is applied to the + input terminal of a conventional pulse-width-modulator integrated circuit illustrated as a block 530 (IC530). This integrated circuit is a conventional type such as type UC15-24A or SG1524B produced by Unitrode whose address is 5 Forbes Road, Lexington, Mass. 02173, or any another similar integrated circuit.

IC530 has its +V, CB and CA input terminals coupled to a source of +15 VDC, and its CL+, CL−, SD and GND terminals grounded. The minus (−) terminal of IC530 is connected to the COMP terminal. A resistor 532 is connected between the RT terminal and ground, and a capacitor 534 is connected between the CT terminal and ground. The +5 terminal of IC530 is coupled by a conductor 536 to potentiometer 518 for applying the +5 volt reference voltage thereto. In this configuration, IC530 produces pulses alternately at the EA and EB terminals, which have a composite duty cycle which may vary from 0% to 100%, in response to the error voltage. The alternating pulses at the EA and EB output terminals of IC530 are amplified by power amplifiers 538 and 540, respectively, for controlling switches 206a and 206b, respectively, to alternately conduct to apply voltage from battery 220 through current sense element 310 to inductor 208. The operating frequency of IC530 is set by resistors 532 and 534 in known fashion, and is selected to be appropriate to the power level and components selected. If desired, IC530 may be synchronized to an external clock signal applied by conductor 542 to the SYNC input terminal.

Figure 5B:
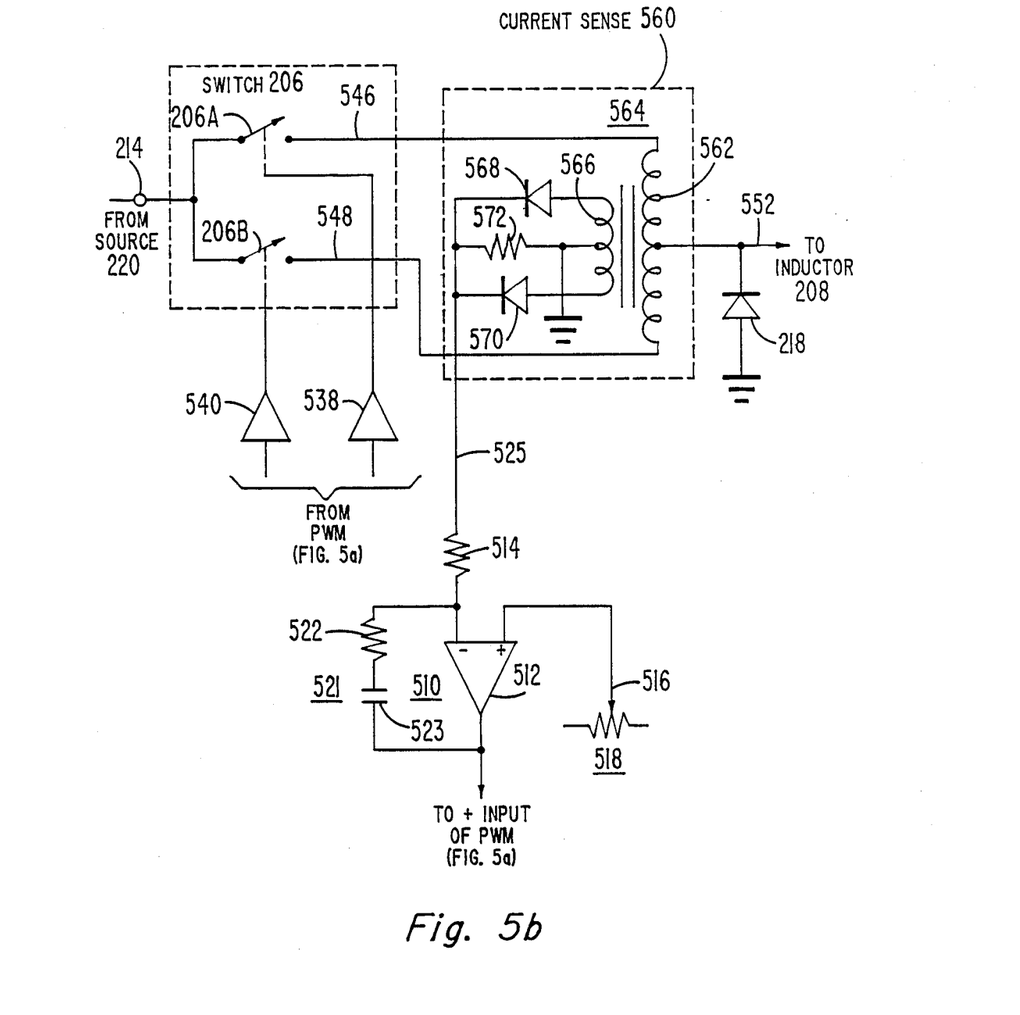
FIG 5b illustrates details of an alternative current sensing circuit.

In the arrangement of FIG. 5a, DC current sense element 310 may be a Hall effect sensor. FIG. 5b illustrates another current sense arrangement which may be substituted for sense element 310 in an arrangement such as that of FIG. 5a in which switch 206 is configured as two alternating switches 206a and 206b. In FIG. 5b, elements corresponding to those of FIG. 5a are designated by the same reference numeral.

In the arrangement of FIG. 5b, conductors 546 and 548 instead of being joined at a node 550 as in FIG. 5a are instead applied to the opposite ends of a winding 562 of a transformer designated generally as 564 which also includes a center-tapped secondary winding 566, the center tap of which is connected to ground. The center tap of primary winding 562 is connected to conductor 552 and to the cathode of catch diode 218. The two halves of winding 562 are wound in opposite directions through the magnetic core. The current from each of switches 206a and 206b appears on conductor 552, just as in the arrangement of FIG. 5a. However, the opposite winding directions of the two halves of primary winding 562 allow the transformer core to reset during each alternating conductive interval of switch 206, so that a useful output can be obtained from secondary winding 566. The ends of secondary winding 566 are connected to a pair of rectifier diodes 568 and 570, the cathodes of which are connected to one end of a resistor 572, the other end of which is grounded. The cathodes of diodes 568 and 570 are also connected by a conductor 525 to the end of resistor 514 remote from operational amplifier 512. In the configuration of FIG. 5b, a voltage representative of the current flowing through switch 206 is produced on conductor 525 and coupled to error amplifier 510, thereby obviating the need for DC current sense arrangement of FIG. 5a . Naturally current sense element 310 and 560 both may be in place, with their outputs available selectively for purposes of reliability.

Figure 6:
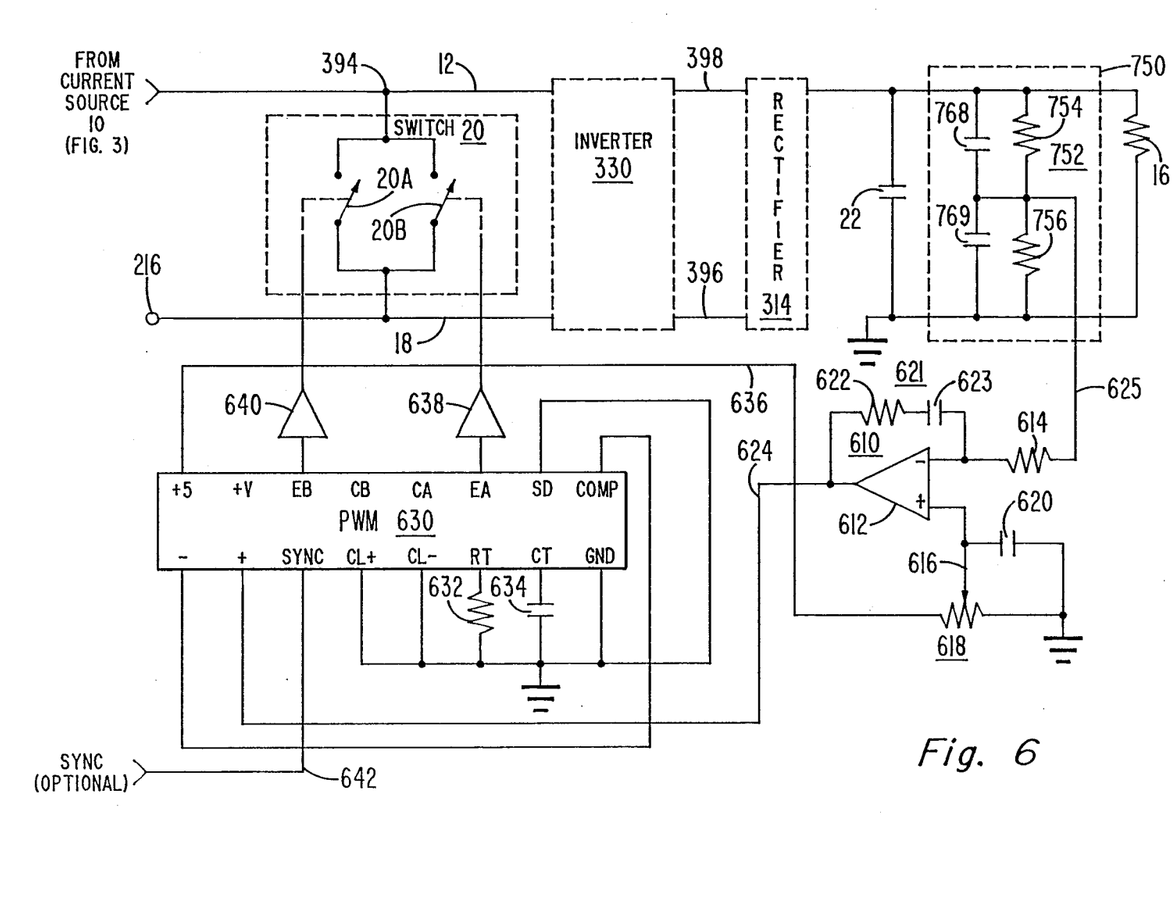
FIG. 6 is a diagram, partially in block and partially in schematic form illustrating details of the control circuit for the voltage control switch arrangment of FIG. 3.

FIG. 6 is a diagram illustrating details of the control circuit for voltage control switch 20. Portions of FIG. 6 are very similar to portions of FIG. 3, and elements of FIG. 3 corresponding to those of FIG. 6 are designated by the same reference numbers. Also, certain elements of FIG. 6 correspond to elements of FIG. 5a but are not identical thereto, and are designated in FIG. 6 by the same reference numeral, but in the 600 series rather than in the 500 series. Generally speaking, the arrangement of FIG. 6 represents a voltage control feedback loop.

In the arrangement of FIG. 6, switch 20 is the controlled element. As illustrated, switch 20 is implemented as two alternately-enabled switches 20A and 20B. That portion of FIG. 6 extending from conductor 625 (at the right of FIG. 6) through amplifier 610, integrated circuit 630 and power amplifiers 638 and 640 substantially corresponds with that portion of FIG. 5a extending from conductor 325 through amplifier 510, IC530 and power amplifiers 538 and 540. The sense input applied to amplifier 610 of FIG. 6 over conductor 625 is derived from a voltage sensing voltage divider arrangement designated generally as 750, which includes a voltage divider 752 consisting of resistors 754 and 756 connected in series across capacitor 22. A capacitor 768 is connected across resistor 754, and a capacitor 769 is connected across resistor 756.

Figure 7:
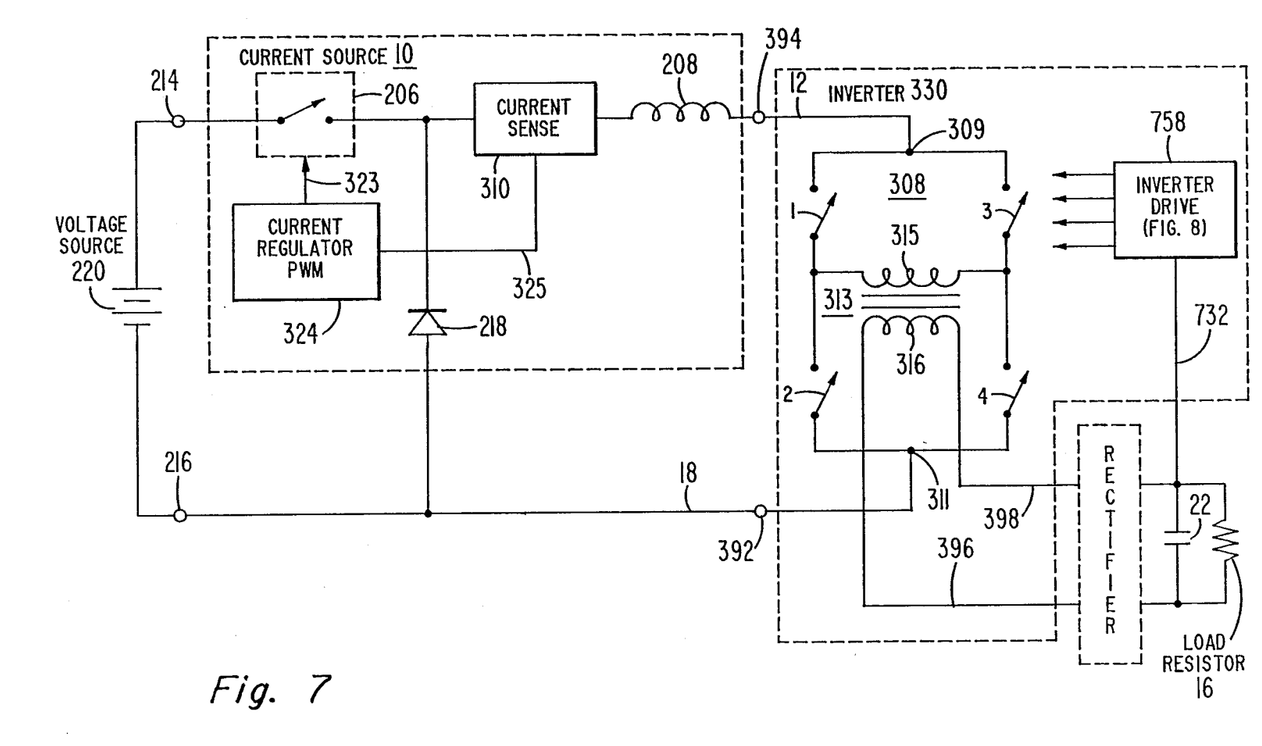
FIG. 7 ia diagram, partially in block and partially in schematic form, of an embodiment of the invention similar to that of FIG. 3, in which the function of the voltage control switch arrangement is performed by timed overlapped closure of the switches of the inverter, and in which a separate voltage control switch is not used.

FIG. 7 illustrates another embodiment of the invention. Generally speaking, FIG. 7 is identical to FIG. 3, except that it does not include an individual voltage control switch connected between points 392 and 394 for shorting together conductors 12 and 18. Instead, the function performed by switch 20 in the arrangement of FIG. 3 is performed in the arrangement of FIG. 7 by a drive arrangement for switches 1, 2, 3 and 4 of inverter bridge circuit 308 which renders at least switches 1 and 2, or switches 3 and 4 simultaneously conductive for portions of the operating cycle. Comparison of the arrangements of FIGS. 3 and 7 shows that, if, for example, switches 1 and 2 of bridge circuit 308 are simultaneously conductive, this has the same effect of shorting conductors 12 and 18 together as switch 20 of FIG. 3. Unlike the arrangement of FIG. 3, inverter drive 758 of FIG. 7 receives the load voltage over a conductor 732 from capacitor 22 and load resistor 16.

Figure 8:
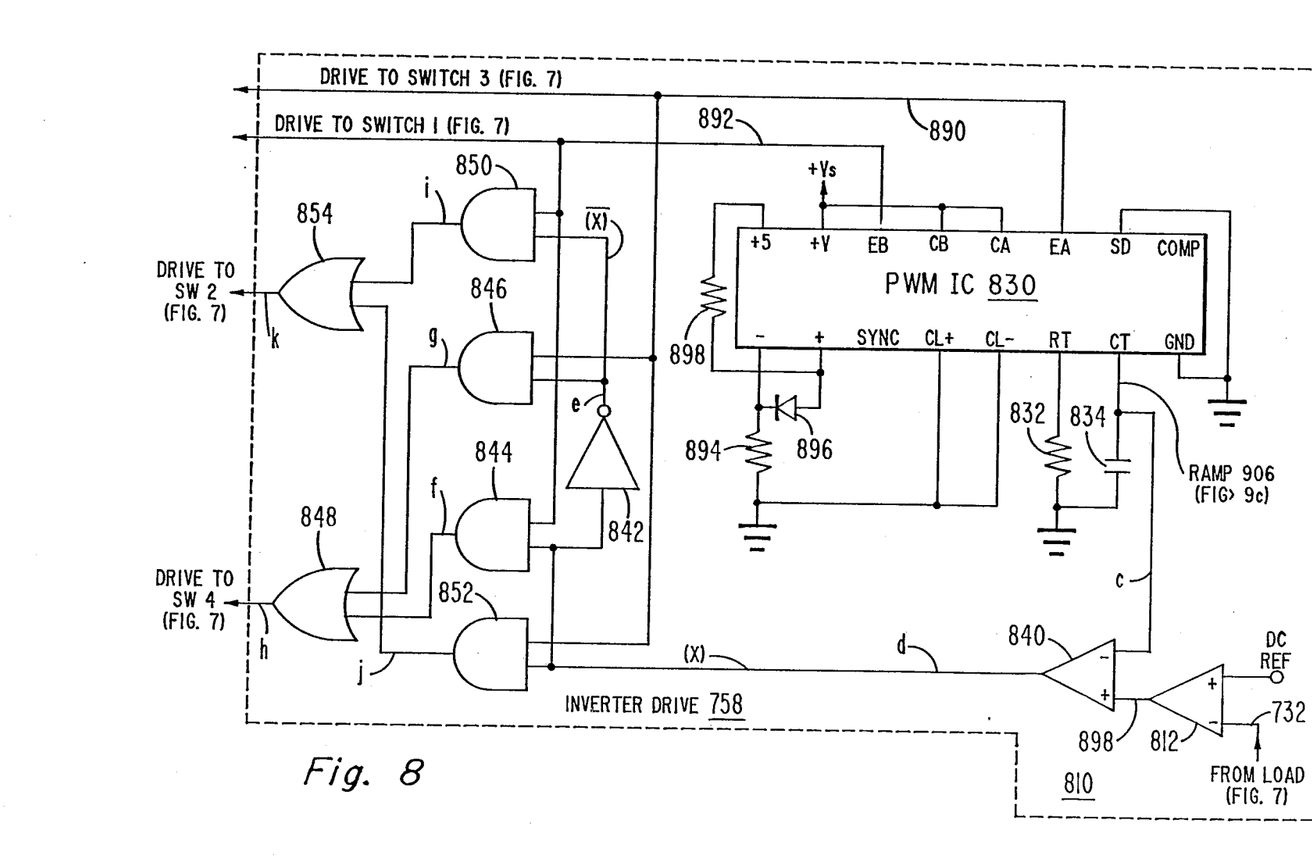
FIG. 8 is a diagram, partially in block and partially in schematic form, of a control circuit for operating the inverter switches of FIG. 7.

FIG. 8 is a diagram illustrating details of inverter drive arrangement 758 of FIG. 7. The arrangement of FIG. 8 includes a pulse width modulator IC830 which may be a type UC1524A similar to that of FIG. 5a, but which is connected somewhat differently. A positive supply voltage $+V_s$ is applied to the +V, CB and CA terminals of IC830, and the CL+, CL−, SD and GND terminals are grounded. The +5 terminal is connected by way of a resistor 898 to the plus (+) input terminal, and a diode 896 has its anode connected to the + terminal and its cathode connected to the minus (−) terminal and, by way of a resistor 894, to ground. IC830 produces continuous, uninterrupted square-wave drive to switch 1 of FIG. 7 by way of a conductor 892 connected to the EB terminal, and to switch 3 of FIG. 7 by way of a conductor 890 connected to the EA terminal. The drive to switch 1 is illustrated as waveform 901 of FIG. 9a, and the drive to switch 3 by way of conductor 890 is illustrated by waveform 903 of FIG. 9b.

In the arrangement of FIG. 8, amplifier arrangement 810 includes an error amplifier 812 which receives at its inverting (−) input terminal a sample of the load voltage from conductor 732 and receives a reference direct voltage at its noninverting (+) input terminal for producing an error voltage on a conductor 898, which is applied to the noninverting input terminal of a comparator 840, which compares the error voltage on conductor 898 with a ramp voltage applied to its inverting input terminal from the CT terminal of IC830. The ramp voltage applied to the inverting input terminal of comparator 840 is illustrated as 906 of FIG. 9c. The output of comparator 840 is a width-modulated signal designated X, which is illustrated as a waveform 908 in FIG. 9d. Signal X is applied by way of conductor d to an inverting amplifier 842, which inverts the signal to produce a signal designated X on a conductor e. Signal X is illustrated as a waveform 910 of FIG. 9e.

Figure 9:
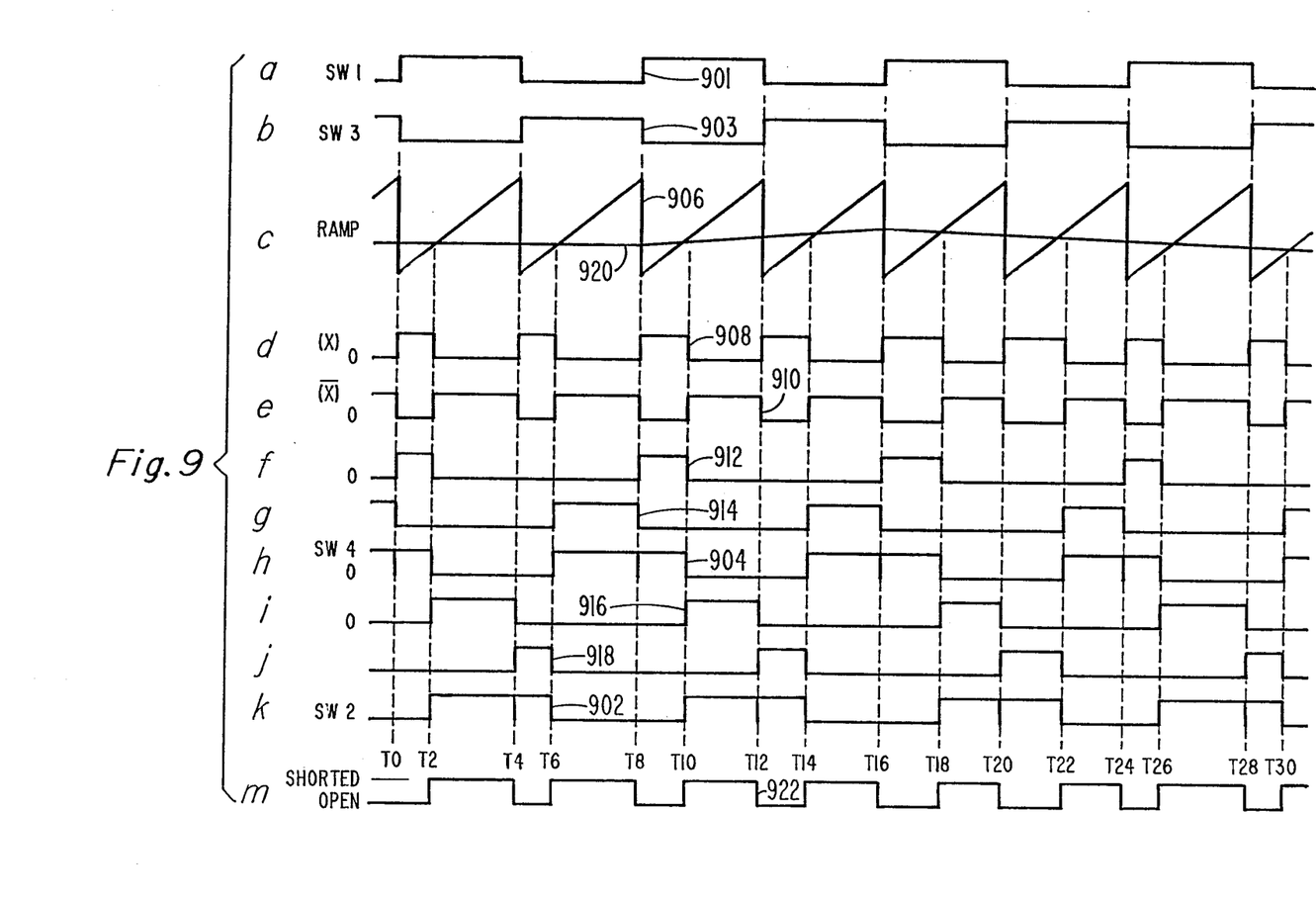
FIGS. 9a–9k, referred to jointly as FIG. 9, are timing diagrams illustrating the waveforms of various voltages, currents and operating states of the arrangement of FIG. 7 during operation.

An AND gate 844 produces on a conductor f for application to an OR gate 848 a signal illustrated as 912 of FIG. 9f by ANDing together waveform 901 of FIG. 9a and waveform 908 of FIG. 9d. An AND gate 846 produces on a conductor g for application to OR gate 848 a signal illustrated as 914 of FIG. 9g as a result of ANDing together signals 903 of FIG. 9b and signal 910 of FIG. 9e. OR gate 848 combines signals 912 on conductor f and 914 on conductor g to produce on a conductor h a signal 904 illustrated in FIG. 9h. Waveform 904 of FIG. 9h is the drive for switch 4 of inverter bridge 308 of FIG. 7. AND gate 850 produces on a conductor i for application to an OR gate 854 a waveform illustrated as 916 of FIG. 9i as a result of ANDing together signal 901 of FIG. 9a and signal 910 of FIG. 9e. AND gate 852 produces on a conductor j and at an input terminal of OR gate 854 a signal illustrated as 918 of FIG. 9j as a result of ANDing together signal 903 of FIG. 9b and signal X of FIG. 9d. Gate 854 ORs together signal 916 of FIG. 9i and signal 918 of FIG. 9j to produce a signal illustrated as 902 of FIG. 9k. Signal 902 produced on conductor k is the drive which is applied to switch 2 of inverter bridge 308 of inverter 330 of FIG. 7. Referring now to FIG. 9c, an illustrative value of the error signal is illustrated as a line 920.

Waveform 922 of FIG. 9m represents the status of bridge circuit 308 of FIG. 7 as shorted or open. In the interval T0-T8, the voltage across load resistor 16 of FIG. 7 remains constant, as indicated by the constant value of error signal 920 of FIG. 9c, and therefore the shorted intervals or the intervals during which inverter bridge 308 is shorted remains constant and is equal to the interval T2-T4, T6-T8. During the interval T8-T16, the load voltage is decreasing, possibly due to an increase in the current consumed by the load, and as a result the error voltage 920 progressively increases in the interval T8-T16. This increases the duration of the interval T12-T14 before comparator 840 switches, resulting in a progressive decrease in the durations during which bridge circuit 308 of FIG. 7 is shorted, as illustrated by the decreasing duration of the high levels of waveform 922 of FIG. 9m in the interval T8-T16. As discussed in conjunction with FIGS. 1 and 2, decreasing the amount of time during which switch 20 is shorted, tends to increase the load voltage.

Thus, the changes in waveform 922 are such as to tend to increase the load voltage to correct for the decrease which initiated the control cycle. In the interval T16-T30, the load voltage increases, and as a result error voltage 920 progressively decreases. This results in an earlier triggering of comparator 840 of FIG. 8, as illustrated by waveform 908 of FIG. 9d, with the result that the shorted periods of operation as illustrated by waveform 922 of FIG. 9m increase in duration. This has the effect of decreasing the load voltage to correct for the increase which initiated the control cycle.

Figure 10:
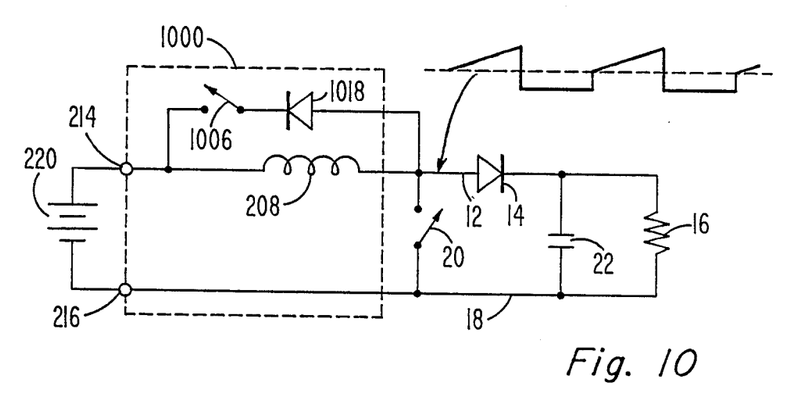
FIG. 10 is a schematic diagram corresponding to the arrangement of FIG. 1 illustrating details of the current source in another embodiment of the invention.

Another embodiment of the invention is illustrated in simplified form in FIG. 10. Elements of FIG. 10 corresponding to those of FIG. 2 are designated by the same reference number. In FIG. 10, current source 1000 is energized by voltage source 220. Current source 1000 includes an inductor 208 connected between terminal 214 and conductor 12. The series combination of a diode 1018 and a switch 1006 is connected across inductor 208. During those intervals in which switch 1006 is open, an increasing ramp current flows through inductor 208 to form part of the output current of current source 1000. During those intervals in which switch 1006 is closed, inductor current circulates through diode 1018 and switch 1006, and not through the load. The current circulating through inductor 208, diode 1018 and closed switch 1006 decreases in magnitude slowly due to circuit losses.

Figure 11:
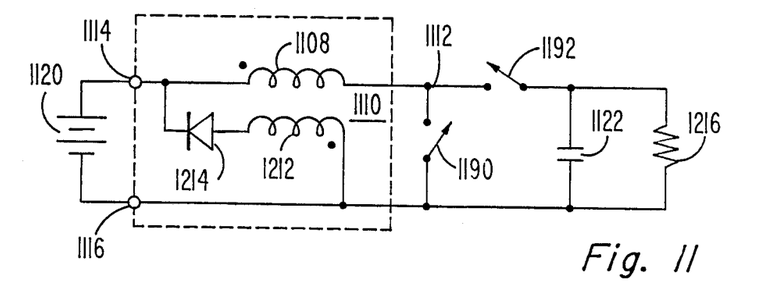
FIG. 11 is a schematic diagram of an embodiment of the invention similar to that of FIG. 1 illustrating yet another type of current source.

FIG. 11 illustrates yet another embodiment of the invention, in which inductive winding 1108 of a transformer 1110 stores energy during those intervals in which a pulse-width controlled current control switch 1190 is conductive, with a current set to correspond to the peak demand by load 1216. Switch 1192 couples current to capacitor 1122 and a load represented by a resistance 1216, and is duty-cycle modulated to maintain the desired load voltage. During those intervals in which both switches are open, the energy stored in transformer 1110 is returned to battery 1120 by winding 1212 and diode 1214.

Other embodiments of the invention will be apparent to those skilled in the art. For example, the electronic switches may be implemented as bipolar transistors, field-effect transistors (FETs), gate-turn-off thyristors, gas or vacuum tubes, and other corresponding electronic devices. These individual devices may be connected in series for increased voltage stand-off capability, in parallel for increased current-handling capability, or in series-parallel for high voltage, high current applications, and if appropriate may be operated for alternating conduction. Also, half bridge or single-switch inverters may be used instead of full-wave bridge inverter 308 of FIGS. 3 or 7.

What is claimed is:

1. A switching regulator, comprising:
   inductance means;
   controllable first switch means serially coupled with said inductant means for forming a series combination of two elements, said series combination of two elements being adapted to be coupled to a source of direct voltage for, when said first switch means is in a conductive condition, causing an increasing ramp current through said indutance means as energy is stored in the magnetic fields associated therewith, and for, when said first switch means is in a nonconductive condition, causing decreasing ramp current in said inductance means;
   first control means coupled to said first switch means and to said inductance means for sensing said increasing and decreasing ramp currents and for recurrently operating said first switch means between said conductive and said nonconductive conditions for maintaining said ramp currents substantially constant, thereby forming a controlled direct current;
   coupling and integrating means coupled to said inductant means and adapted to be coupled to utilization means for receiving at least a portion of said controlled direct current and for producing a direct load voltage in responsve to the average value thereof for utilization by said utilization means, said coupling and integrating means further including transformer means including primary and secondary windings, inverter means coupled to said inductance means and to said transformers means for receiving at least said portion of said controlled direct current and for applying said controlled direct current so received to said primary winding, and for periodically reversing the direction of flow of said controlled directed current so received through said primary winding, for generating an alternating current in said secondary winding, and rectifying and filtering means coupled to said secondary winding for rectifying and integrating said alternating current for producing said direct load voltage;
   controllable second switch means coupled to said inductance means for selectively short-circuiting said inductance means for causing said controlled direct current to bypass said coupling and integrating means and to circulate instead through said inductance means; and
   second control means coupled to said second switch means and said coupling and integrating means for sensing said direct load voltage and for recurrently controlling the operating condition of said second switch means for maintaining said average value of said direct load voltage substantially constant.

2. A switching regulator according to claim 1 wherein:
   said series combination of two elements is serially coupled with said coupling and integrating means for forming three-element series combination; and
   said three-element series combination is adapted to be coupled across first and second terminals of said source of direct voltage for being energized thereby.

3. A switching regulator according to claim 1 wherein:
   said first switch means is adapted to be coupled to said first terminal of a source of direct voltage;
   said coupling and integrating means is adapted to be coupled to a second terminal of said source of direct voltage; and
   said inductance means is coupled at a juncture to said first switch means and is also coupled to said coupling and integrating means; and further comprising
   free-wheeling diode means adapted to be coupled to said second terminal of said source of direct voltage and to said juncture of said inductance means and said first switch means for allowing said decreasing ramp current to flow through said inductance means during those intervals in which said first switch means is nonconductive.

4. A switching regulator according to claim 1 wherein said inverter periodically reverses said direction of flow of said controlled direct current at a frequency higher than the switching frequency of said second switch means.

5. A regulated voltage supply, comprising:
   inductance means;
   controllable first switch means coupled with said inductance means for forming a combination of two elements, said combination of two elements being adapted to be coupled to a source of direct voltage for, when said first switch means is in a conductive state, causing an increasing ramp current through said inductance means as energy is stored in the magnetic fields associated therewith, and for, when said first switch means is in a nonconductive state, causing a decreasing ramp current in said inductance means;

current sensing means coupled to said combination of two elements for sensing said increasing and decreasing ramp currents and for generating a current-representative voltage;

current control means coupled to said first switch means and to said current sensing means for sensing said increasing and decreasing ramp currents and for recurrently operating said first switch means between said conductive and nonconductive states for maintaining said ramp currents substantially constant, thereby forming a controlled direct current;

a transformer including primary and secondary windings;

switching bridge inverter means coupled to said series combination of two elements for receiving at least a portion of said controlled direct current therefrom, and coupled to said primary winding of said transformer for applying said portion of said controlled direct current to said primary winding in an alternating manner for thereby transforming alternating current to said secondary winding;

full wave rectifying means coupled to said secondary winding for rectifying said alternating current to produce pulsating direct voltage;

capacitance means coupled to said full wave rectifying means for averaging said pulsating direct voltage to produce an output voltage adapted to be utilized by utilization means;

controllable second switch means coupled to said inductance means for selectively short-circuiting said inductance means for causing said controlled direct current to bypass said switching bridge inverter means and to circulate instead through said inductance means, whereby said portion of said controlled direct current is received by said switching bridge inverter means during those times in which said controllable second switch means is in a nonconductive state; and voltage regulation means coupled to said capacitance means and to said controllable second switch means for recurrently changing the state of said controllable second switch means between said conductive state and said nonconductive state in response to said output voltage for closing a voltage-controlling degenerative feedback loop which tends to maintain said output voltage constant.

6. A supply according to claim 5 further comprising second rectifying means coupled to said inductance means for conducting said decreasing ramp current during those intervals in which said first switch means is nonconductive.

7. A supply according to claim 5 wherein said voltage regulation means comprises pulse width modulation means.

8. A supply according to claim 5 further comprising controllable third switch means including a terminal adapted to be coupled to said source of direct voltage and also including a second terminal, and wherein said controllable first switch means comprises a terminal adapted to be coupled to said source of direct voltage and a second terminal, said third and first switch means being alternately enabled by said current control means; and wherein said current sensing means comprises transformer means including a primary winding coupled at first and second ends to said second terminals of said third and first controllable switch means, said primary winding including a center-tap adapted for carrying said increasing and decreasing ramp currents, said transformer means further including a secondary winding for generating a sample of said increasing and decreasing ramp currents, said current sensing means further comprising second rectifying means coupled to said secondary winding for generating said current-representative voltage.

9. A switching regulator, comprising inductance means;

controllable first switch means serially coupled with said inductance means for forming a series combination of two elements, said series combination of two elements being adapted to be coupled to a source of direct voltage for, when said first switch means is in a conductive condition, causing an increasing ramp current through said inductance means as energy is stored in the magnetic fields associated therewith, and for, when said first switch means is in a nonconductive condition, causing a decreasing ramp current in said inductance means;

first control means coupled to said first switch means and to said inductance means for sensing said increasing and decreasing ramp currents and for recurrently operating said first switch means between said conductive and said nonconductive conditions for maintaining said ramp currents substantially constant, thereby forming a controlled direct current;

coupling and integrating means coupled to said inductance means and adapted to be coupled to utilization means for receiving at least a portion of said controlled direct current and for producing a direct load voltage in response to the average value thereof for utilization by said utilization means, said coupling and integrating means further including transformer means including primary and secondary windings for producing alternating secondary current in said secondary winding in response to alternating primary current applied to said primary winding;

rectifying and filtering means coupled to said secondary winding for rectifying and integrating said alternating secondary current to produce said direct load voltage;

controllable second switch means coupled to said inductance means and to said primary winding for selectively short-circuit said inductance means for causing said controlled direct current to bypass said coupling and integration means and to circulate instead through said inductance means, and for applying at least said portion of said controlled direct current to said primary winding as said primary current, and for periodically reversing the direction of flow of said controlled direct current through said primary winding for generating said alternating secondary current; and second control means coupled to said second switch means and to said coupling and integrating means for sensing said direct load voltage and for recurrently controlling the operating condition of said second switch means for maintaining said average value of said direct load voltage substantially constant.

10. A switching regulator according to claim 9 wherein:
   said first switch means is adapted to be coupled to a first terminal of said source of direct voltage;
   said inductance means includes first and second ends, and said first end is coupled at a juncture to said first switch means; and
   said second switch means comprises a four-switch bridge including a first pair of terminals including first and second terminals adapted to be coupled for receiving current, and also comprises a second pair of terminals including third and fourth terminals adapted to be coupled to a load, said first terminal of said first pair of terminals being coupled to said second end of said inductance means, and said second terminal of said first pair of terminals being adapted to be coupled to said second terminal of said source of direct voltage, and said second pair of terminals of said bridge being coupled to said primary winding.

* * * * *